Figure 1:
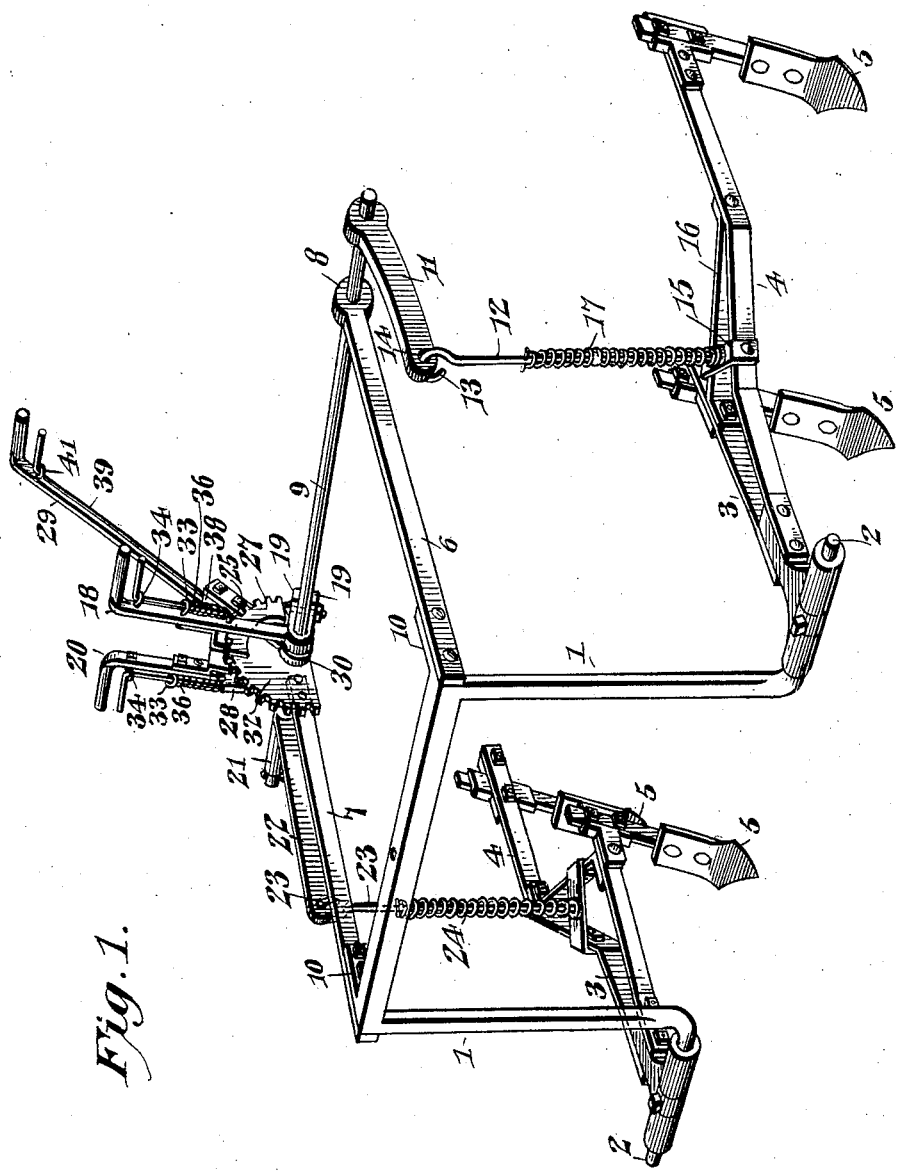

No. 828,265. PATENTED AUG. 7, 1906.
S. E. BAILOR.
ADJUSTING DEVICE FOR DRAG BARS OR BEAMS FOR CULTIVATORS.
APPLICATION FILED SEPT. 6, 1905.

2 SHEETS—SHEET 1.

Witnesses
Jas. F. McCathran
H. F. Riley.

Silas E. Bailor, Inventor
By C. G. Siggers
Attorney

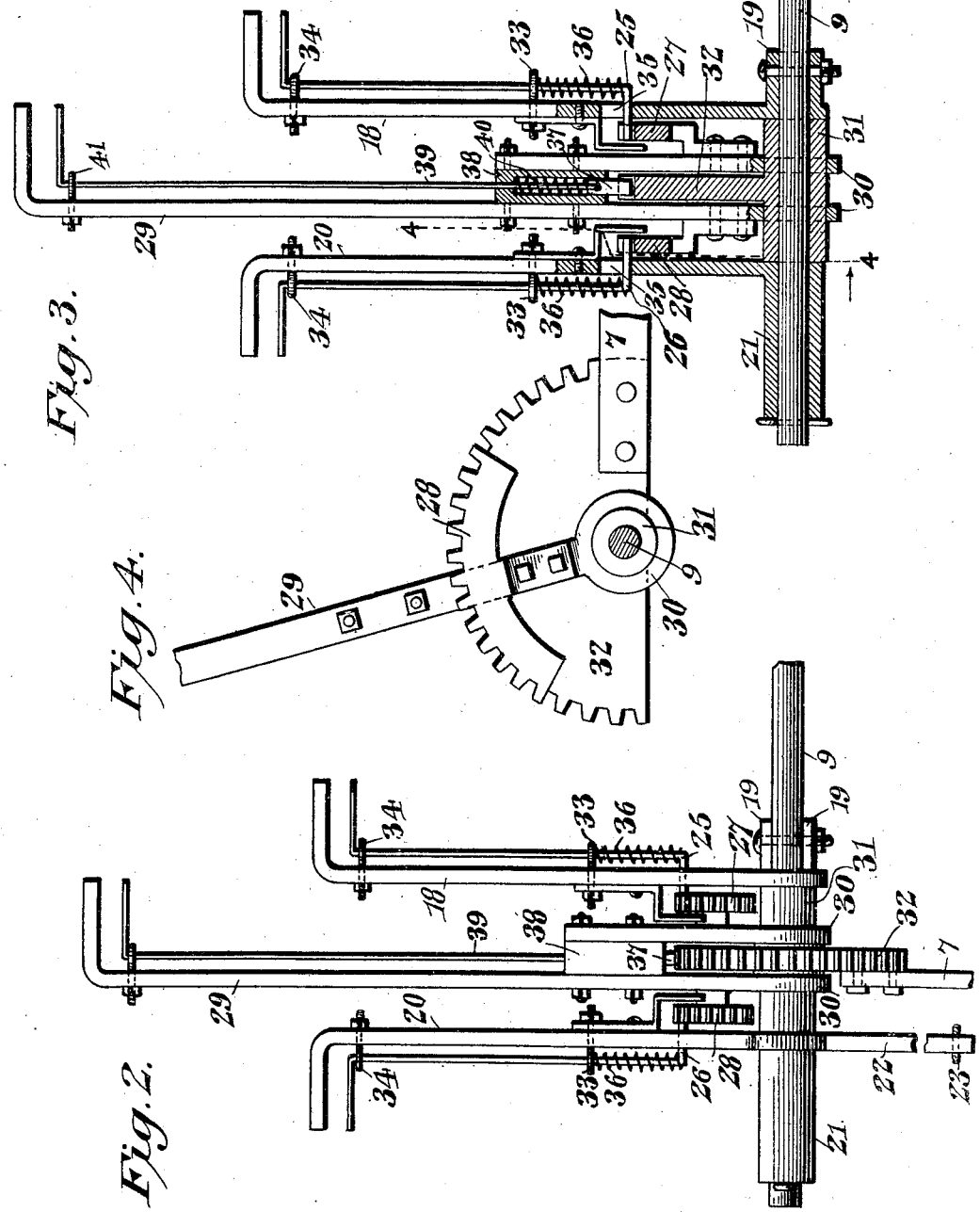

UNITED STATES PATENT OFFICE.

SILAS E. BAILOR, OF TARKIO, MISSOURI.

ADJUSTING DEVICE FOR DRAG BARS OR BEAMS FOR CULTIVATORS.

No. 828,265.  Specification of Letters Patent.  Patented Aug. 7, 1906.

Application filed September 6, 1905. Serial No. 277,190.

*To all whom it may concern:*

Be it known that I, SILAS E. BAILOR, a citizen of the United States, residing at Tarkio, in the county of Atchison and State of Missouri, have invented a new and useful Adjusting Device for Drag Bars or Beams for Cultivators, of which the following is a specification.

The invention relates to improvements in adjusting devices for drag bars or beams for cultivators.

The object of the present invention is to improve the construction of adjusting devices for drag bars or beams for cultivators and to provide a simple and comparatively inexpensive device of great strength and durability adapted to be readily applied to various kinds of cultivators and capable of enabling the opposite cultivating devices to be raised and lowered independently or simultaneously for adjusting them to the desired depth and for throwing one or both of them out of operation.

A further object of the invention is to provide a device of this character adapted to be conveniently mounted on various parts of a cultivator and capable of enabling the cultivating devices to be readily locked at any adjustment.

With these and other objects in view the invention consists in the construction and novel combination and arrangement of parts, hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of an adjusting device constructed in accordance with this invention and shown applied to two gangs of cultivating devices. Fig. 2 is an enlarged plan view of the adjusting device, the levers being swung downward. Fig. 3 is an enlarged vertical sectional view, the levers being arranged vertically. Fig. 4 is a vertical sectional view on the line 4 4 of Fig. 3, illustrating the construction of the large ratchet and the central operating-lever.

Like numerals of reference designate corresponding parts in all the figures of the drawings.

1 designates an arch adapted to straddle a row and provided at the lower ends of its sides with laterally-extending pivots 2, on which are mounted drag bars or beams 3 and 4, carrying suitable cultivating devices, such as shovels 5 or the like. The arch may be of any desired construction and may be mounted on a straddle-row cultivator of any desired character in any preferred manner. The drag bars or beams may also be constructed in any desired manner, and they may be equipped with cultivating devices of any preferred form.

Mounted on the arch 1 at opposite sides thereof is a pair of rearwardly-extending arms 6 and 7, which carry bearings for the reception of a transverse rock-shaft 9. The arm 6 is provided at its rear end with an eye 8 to form one of the bearings, and the other bearing is constructed as hereinafter explained. The arms 6 and 7, which support the rock-shaft, are secured at their front ends to short arms or extensions 10 of the arch; but it will be readily apparent that the supporting arms or bars 6 may be mounted on any suitable portion of a cultivator for arranging the rock-shaft 9 above the drag bars or beams 3 and 4. The rock-shaft 9, which extends laterally from the supporting arms or bars 6 and 7, is provided at its outer end with an oscillatory arm 11, extending forwardly from and keyed, bolted, or otherwise secured to the rock-shaft. The oscillatory arm 11 is suitably connected with the outer cultivating devices by means of a rod 12, provided at its upper end with an eye or hook 13, which is linked into an eye or opening 14 of the arm 11 of the rock-shaft. The lower end of the link or rod 12 is slidably connected with the drag bars or beams by means of a clip or plate 15, secured to the outer bar or beam 4 and to a brace 16, which connects the inner and outer drag bars or beams 3 and 4. A coiled spring 17, which is mounted on the link or rod 12, yieldably holds the cultivating device in the soil; but any other suitable means may be employed for connecting the oscillatory arm with the cultivating devices.

The rock-shaft 9 is oscillated for raising and lowering the outer cultivating devices by means of an outer lever 18, provided at one end with an eye or sleeve 19, which may be keyed, bolted, or otherwise secured to the rock-shaft and which extends rearwardly or upwardly from the rock-shaft. The outer operating-lever is adapted to be swung backward or forward for raising or lowering the outer cultivating devices, and the said lever is secured in its adjustment by the means hereinafter described. The inner cultivating devices, or those at the opposite side of the arch, are raised and lowered by means of an inner lever 20, fulcrumed at an intermediate point on the rock-shaft and provided between its ends with an elongated eye or sleeve 21, through which the adjacent end of the rock-shaft passes, as clearly illustrated in Fig. 3 of the drawings. The front arm 22 of the inner operating-lever is connected, by a link or rod 23, with the inner cultivating devices, and the latter are yieldably held in engagement with the soil by means of a coiled spring 24, arranged in the same manner as the spring 17, heretofore described.

The outer and inner operating-levers 18 and 20 are provided with spring-actuated latches 25 and 26, which engage ratchets 27 and 28 of a centrally-arranged operating-lever 29. The centrally-arranged operating-lever has a forked or bifurcated lower portion 30, composed of two sides and provided with eyes or openings through which passes the rock-shaft and which are arranged on a fixed sleeve 31 of a centrally-arranged ratchet 32. The intermediate or central lever may be constructed in any desired manner, and the side ratchets 27 and 28 consist of toothed segments. The latches 25 and 26, which are mounted on the outer and inner operating-levers, may be constructed in any desired manner, and as illustrated in the accompanying drawings consist of rods extending longitudinally of the operating-levers 18 and 20 and slidable in guides 33 and 34. Each rod has its ends bent in opposite directions at right angles, the inner or lower ends being extended through openings 35 of the levers 18 and 20. The outer ends of the latches are bent outward to form handles or grips and are arranged adjacent to the handles or grips of the operating-levers 18 and 20. The latches 25 and 26 are normally maintained in engagement with the side latches by means of coiled springs 36, disposed on the rods and interposed between the lower ends of the same and the inner or lower guides 33. The intermediate lever, which straddles the intermediate ratchet, is secured in its adjustment by means of a spring-actuated dog or detent 37, guided in a suitable casing 38 and operated by a rod 39. The dog or detent is normally held in engagement with the intermediate ratchet by means of a coiled spring 40, housed within the casing and engaging the dog or detent, as clearly illustrated in Fig. 3 of the drawings. The housing or casing for the spring and the detent may consist of a spacing block or piece interposed between the sides of the lower portion 30 of the intermediate lever. The side ratchets are preferably bolted to the sides of the lower portion 30 of the intermediate lever; but it will be apparent that the latter and the side ratchets may be constructed in any other preferred manner. The rod 39, which is arranged in an upper or outer guide 41, has its outer end bent at an angle to form a grip or handle, which is arranged adjacent to the grip or handle of the intermediate lever. The large intermediate ratchet is secured to the supporting bar or arm 7 and is provided with the said sleeve 31, which forms one of the bearings for the rock-shaft.

The intermediate lever, which is locked to the intermediate ratchet, is adapted to hold the side ratchets stationary, and either of the side levers 18 and 20 may be operated independently of the other for adjusting the corresponding cultivating devices. When it is desired to adjust the cultivating devices simultaneously, the intermediate lever is oscillated and will carry with it the side ratchets and the side levers, which are locked to the same. This will enable the cultivating devices at both sides of the arch to be raised or lowered by a single adjustment.

Having thus fully described my invention, what I claim as new, and desire to secure by Letters Patent, is—

1. In a machine of the class described, the combination of an arch provided with projecting supporting-bars carrying bearings, a continuous rock-shaft mounted in the bearings, opposite cultivating devices movably connected with the arch, one of the cultivating devices being connected with the rock-shaft, means mounted on the rock-shaft for adjusting the other cultivating device, and means for adjusting the rock-shaft.

2. In a machine of the class described, the combination of an arch provided at opposite sides with projecting supporting-bars carrying bearings, a continuous rock-shaft mounted in the bearings, opposite cultivating devices movably connected with the sides of the arch, one of the cultivating devices being also connected with the rock-shaft, a lever fixed to the rock-shaft for operating the same, an independently-operable lever fulcrumed on the rock-shaft and connected with the other cultivating device, and means for connecting the levers together for adjusting the opposite cultivating devices simultaneously.

3. In a machine of the class described, the combination of an arch provided with supporting-bars carrying bearings, a continuous rock-shaft mounted in the bearings, opposite cultivating devices movably connected with the arch, one of the cultivating devices being also connected with the rock-shaft, a lever fulcrumed between its ends on the rock-shaft and having one arm connected with the other cultivating device, and means for adjusting the rock-shaft.

4. In a machine of the class described, the combination with an arch, of supporting-bars extending from the arch and carrying bearings, a rock-shaft mounted in the bearings, opposite cultivating devices pivotally connected with the sides of the arch, means for connecting one of the cultivating devices with the rock-shaft, and a pair of levers mounted on the rock-shaft, one of the levers being fixed to the same and the other lever being movable independently thereof and connected with the other cultivating device.

5. In a machine of the class described, the combination with an arch having laterally-extending pivots, of opposite cultivating devices mounted on the pivots, a rock-shaft carried by the arch and connected with one of the cultivating devices, and a pair of levers mounted on the rock-shaft, one of the levers being fixed to the rock-shaft and the other being adjustable independently thereof and connected with the other cultivating device.

6. In a device of the class described, the combination with an arch, of opposite supporting-bars, an intermediate ratchet mounted on one of the supporting-bars, a continuous rock-shaft journaled in suitable bearings of the ratchet and the opposite supporting-bar, opposite cultivating devices connected with the arch, one of the cultivating devices being also connected with the rock-shaft, a pair of levers mounted on the rock-shaft at opposite sides of the said ratchet, one of the levers being fixed to the rock-shaft, and the other being independently movable and connected with the other cultivating device, an intermediate lever mounted on the rock-shaft and provided with means for engaging the said ratchet, and means for connecting the side levers with the intermediate lever.

7. In a machine of the class described, the combination with opposite cultivating devices, of a continuous rock-shaft connected with one of the cultivating devices, a lever rigid with the rock-shaft, an independently-operable lever also mounted on the rock-shaft and connected with the other cultivating device, and means mounted on the rock-shaft for connecting the levers to adjust both cultivating devices simultaneously.

8. In a machine of the class described, the combination of opposite cultivating devices, a single continuous rock-shaft connected with one of the cultivating devices, a lever fulcrumed between its ends and having one of its arms connected with the other cultivating device, means for operating the rock-shaft, and means separate from the said means for connecting the same with the said lever for adjusting both cultivating devices simultaneously.

In testimony that I claim the foregoing as my own I have hereto affixed my signature in the presence of two witnesses.

SILAS E. BAILOR.

Witnesses:
  W. H. NEELY.
  W. F. PRESTON.